United States Patent
Davidson et al.

[15] 3,648,429
[45] Mar. 14, 1972

[54] PACKAGING MACHINE

[72] Inventors: Ralph L. Davidson, Worcester; James H. Arsenault, Whitinsville, both of Mass.

[73] Assignee: Curtis & Marble Machine Co., Worcester, Mass.

[22] Filed: Dec. 23, 1969

[21] Appl. No.: 887,558

[52] U.S. Cl. ............................53/77, 53/182, 53/229, 53/373
[51] Int. Cl. ............B65b 11/12, B65b 11/48, B65b 51/30
[58] Field of Search..............53/28, 33, 180, 182, 229, 373, 53/77

[56] References Cited

UNITED STATES PATENTS

| | | | |
|---|---|---|---|
| 3,191,356 | 6/1965 | Zelnick et al. | 53/182 |
| 3,237,371 | 3/1966 | Gerlach | 53/182 |
| 3,396,506 | 8/1968 | Geyer et al. | 53/229 X |
| 3,503,175 | 3/1970 | Marasso et al. | 53/182 X |

*Primary Examiner*—Travis S. McGehee
*Assistant Examiner*—Neil Abrams
*Attorney*—Kenway, Jenney & Hildreth

[57] ABSTRACT

Apparatus for wrapping bundles in heat-sealable plastic sheet material and sealing the plastic along the side and ends of the bundle. A vertically adjustable side sealing mechanism adapts itself to different size bundles, and the end sealing mechanism automatically is adjusted to perform its end sealing at a horizontal diametrical plane the same as the side sealing is done and at a constant height above floor level. Additional pressure applying means are provided to insure proper sealing along elongated bodies, as well as safety latches to prevent accidental release of the sealing members.

9 Claims, 7 Drawing Figures

INVENTORS
RALPH L. DAVIDSON
JAMES H. ARSENAULT
BY
Kenway, Jenney & Hildreth
ATTORNEYS

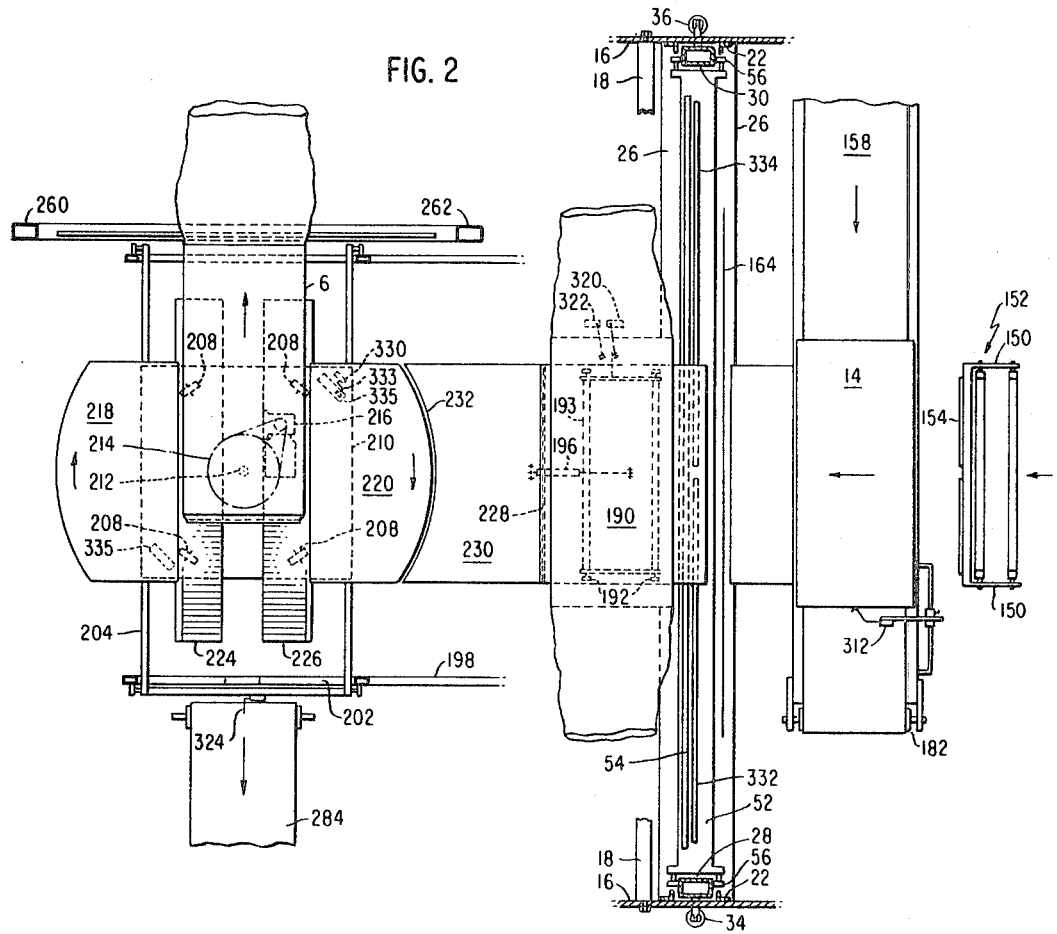

INVENTORS
RALPH L. DAVIDSON
JAMES H. ARSENAULT
BY
Kenway, Jenney & Hildreth
ATTORNEYS

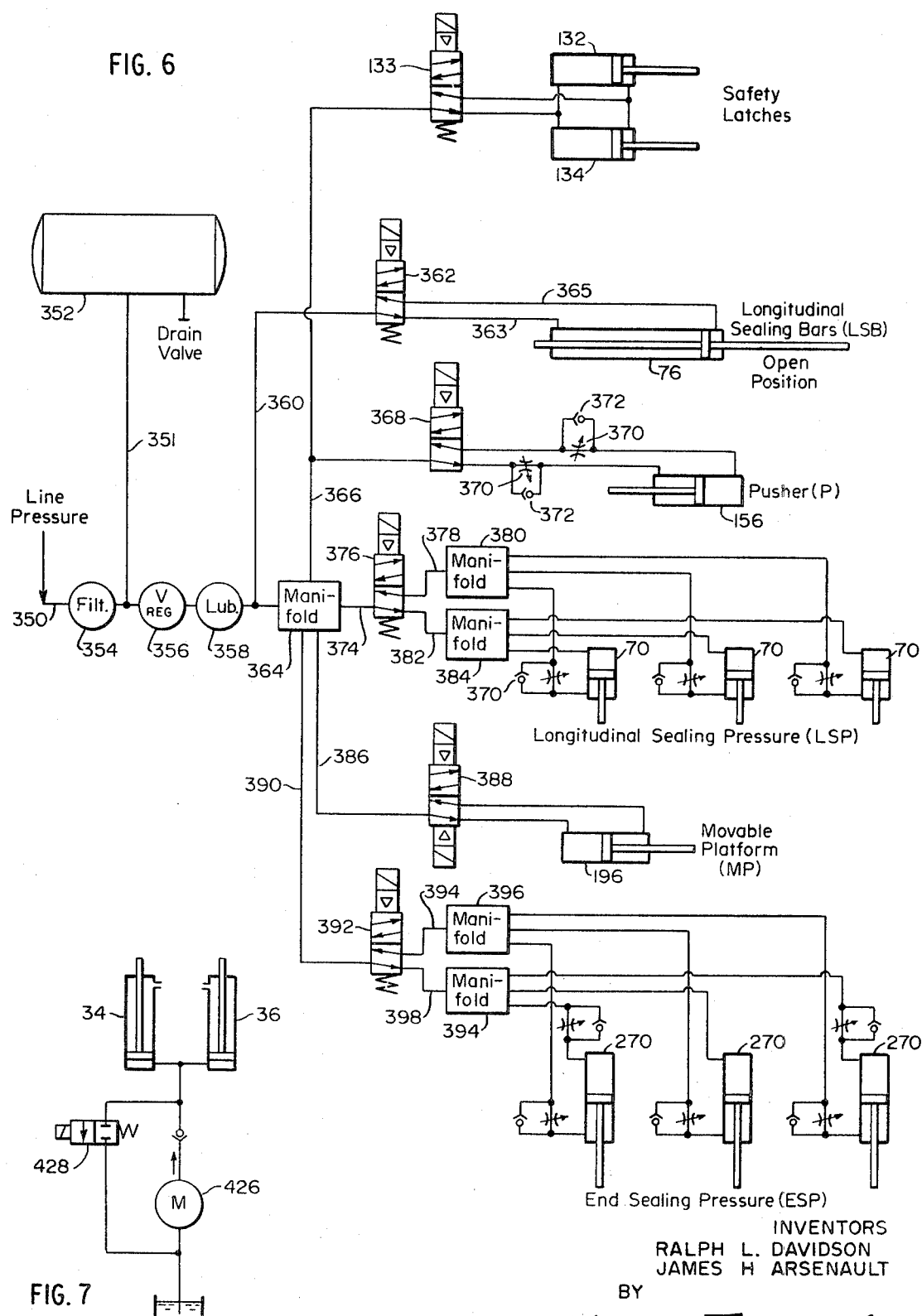

PACKAGING MACHINE

BACKGROUND OF THE INVENTION

Many types of machines for wrapping bundles have been devised using heat-sealable materials, particularly since the advent of the heat-sealable plastics such as, for example, the rubber hydrochloride products sold by Goodyear Tire and Rubber Company of Akron, Ohio under the trade name Pliofilm, and heat-sealable cellophane and Koroseal. Such machines may be divided arbitratily into two classes: those in which the bundle to be wrapped are moved in a general horizontal direction, against a vertically extending sheet of the heat-sealable plastic, the motion carrying the plastic with the bundle so that the bundle is wrapped. A pair of vertically operating heat-sealing members then close behind the bundle, to heat seal the enveloping sheet edges together, as well as severing these. The severing also seals the trailing edges together of the remainder of the sheet, so that for the next succeeding bundle again a vertically extending continuous sheet of the sealable plastic is presented to the next bundle. The other class of machines operates in a vertical direction, so that the bundle is moved either vertically upward or downward drawing the horizontally extending sheet of heat-sealable plastic with it to envelop the bundle, with horizontally moving heat sealing and severing members closing above or below, respectively, the bundle to heat seal and sever the packaged bundle from the remainder of the sheet. The remaining trailing edges of the sheets are sealed together simultaneously to present a continuous sheet of packaging material to the next succeeding bundle.

The horizontally types of machine are generally rather complex and are not readily adaptable to handling either very large or heavy bundles (such as large bolts of cloth used in textile industries) or bundles which occur in variable sizes. If such a machine is adjusted so as to accept one size of bundle, and then a succeeding bundle is either larger or smaller, the time involved to make a change to adapt the new size of bundle is prohibitively long.

Another problem exists as to the horizontal machines, in that if the side seam (that is, a seam which extends along the length of the bundle and preferably on a diametrical horizontal plane) is made for a large bundle (for example, one 3 feet in diameter) then when the ends are sealed, an operator must reach a considerable distance upwardly to gather the trailing folds of material at the ends of the bundle for sealing. On the other hand, if a smaller bundle is packaged by the machine, then the level of the trailing end folds will be lower and therefore the operator must stoop. Accordingly, the mechanism used to seal the ends should also be adjustable as to height, and such adjustment presents problems of its own.

Further problems exist, particularly in respect to such machines adapted to wrap and seal very large bundles in heat-sealable plastic. For example, if a bundle is 6 to 10 feet long and heat-sealing is to be done completely along the entire length of the lateral or side seam, then the elongated heat-sealing members must be rigid enough to present uniform pressure at all points along the length of the seam. This means that these heat-sealing members are bulky and very heavy since they generally are constructed of structural steel. If accidentally such an upper heat-sealing member should be released while an operator's hand or arm was between the sealing bars, an injury might occur both to the operator and to the machine. Safety features should therefore be provided to prevent any unscheduled or accidental downward motion of the upper sealing bar.

SUMMARY OF THE INVENTION

Accordingly, it is the general object of this invention to provide a consolidated apparatus which solves the above problems.

One object of the invention is to provide a machine which is adaptable to seal in heat-sealable plastic a large variety of shapes, sizes and weights of bundles.

Another object of the invention is to provide apparatus of the above kind, in which the mechanism which provides the seal along the lateral side length of the bundle can be easily adjusted upwardly and downwardly so that the lateral or side seam along the entire length of the bundle occurs generally in the horizontal diametrical plane.

A further object of the invention is to provide an additional mechanism to seal the folds of plastic wrapping material along the ends of the bundle at a diametrical horizontal plane, the sealing of the ends always taking place at a predetermined constant height of the floor of which the entire apparatus rests, for the convenience of the operator.

A still further object of the invention is to provide apparatus of the above kinds, in which the cost of the apparatus is reduced by providing only one mechanism for sealing the ends, and simple additional means whereby the entire roll (regardless of its size and weight) can be rotated so as to present the other end to the same end sealing mechanism.

Yet another object of the invention is to provide apparatus of the above kinds in which safety latches are provided to prevent accidental downward motion of a top sealing bar and thus avoid injury either to the machine or to the operator thereof.

Another object of the invention is to provide apparatus of the above kinds, in which the height of the platform on which the bundle rests for end sealing is adjustable upwardly or downwardly but in an opposite direction to the adjustment of the side sealing means, this adjustment taking place automatically when the side sealing means is adjusted upwardly or downwardly to accommodate the machine to large or small bundles.

A further object is to provide a machine of the above kinds in which the supporting tables are so movable relative to each other as to facilitate the passage of a heavy bundle through the machine, and yet not interfere with the sealing members during a sealing operation.

Other objects and advantages of the invention will be in part obvious and in part pointed out hereinafter in the following description.

The invention accordingly comprises the elements and combinations of elements, features of construction, arrangements of parts, and manipulation of the apparatus all of which will be exemplified in the structures hereinafter set forth, and the scope of the application of which will be indicated in the appended claims.

BRIEF DESCRIPTION OF THE DRAWINGS

FIG. 2 is a plan view of the embodiment of FIG. 1, the portions thereof being broken away for clarity of illustration;

FIG. 3 is a side elevation corresponding to the FIG. 2 plan, showing schematically certain positioning of elements of the apparatus and with a bundle of cloth on an exit platform about ready to be side sealed;

FIG. 6 is a schematic drawing of the fluid power system which operates the apparatus, the symbols used being basically those of the USA Standard Graphic Symbols for Fluid Power Diagrams, published by the American Society of Mechanical Engineers; and FIG. 7 is a schematic fluid power system for frame elevation.

Figure 1:
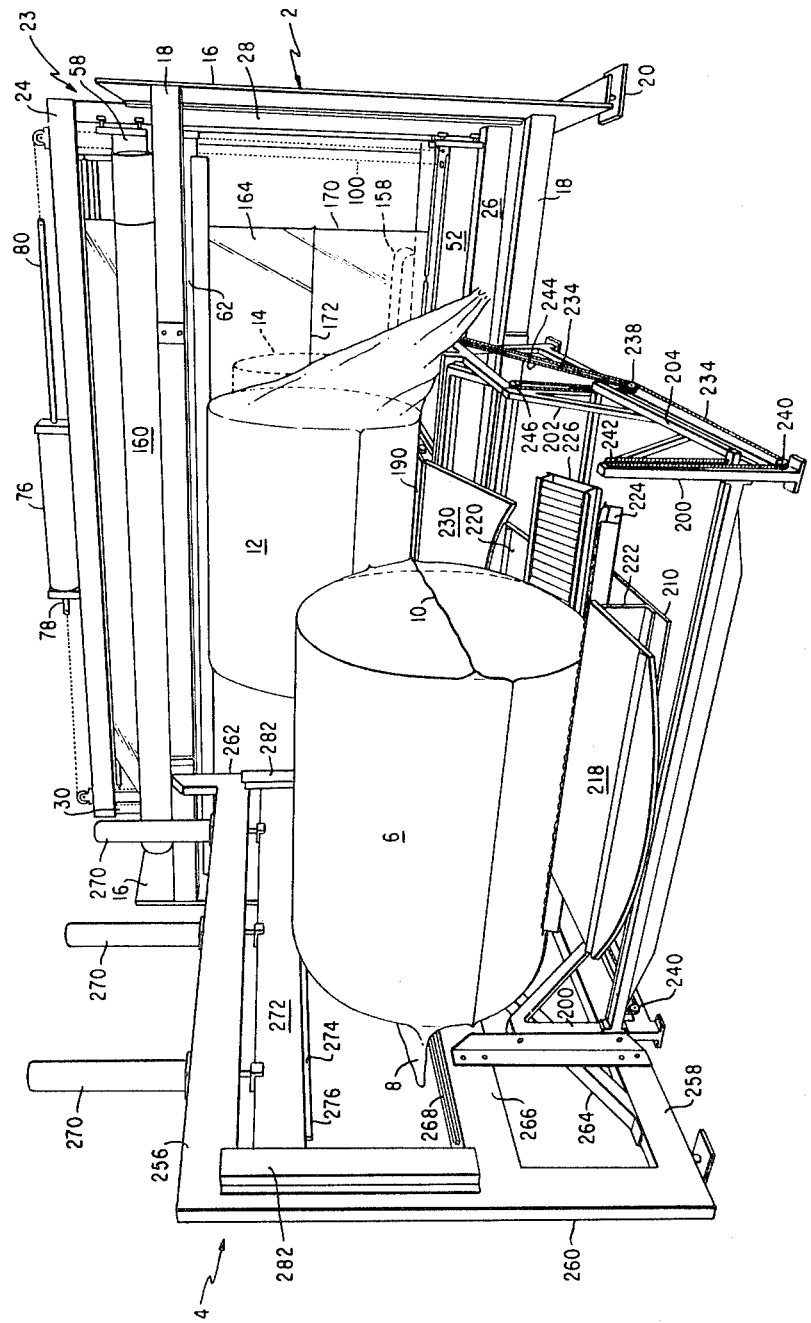
FIG. 1 is an illustration of one embodiment of this invention, showing one bundle of exemplary cloth about to be end sealed, a following bundle already side sealed, and a still following bundle about to be moved into the machine for side sealing.

Throughout the drawings, similar reference characters indicate corresponding parts. The drawings illustrate one of various possible embodiments of the invention, and for clarity of illustration and understanding of the invention, the dimensions of certain of the parts as shown in the drawings may have been modified and/or exaggerated for the purpose of such clarity.

DESCRIPTION OF THE INVENTION

Referring first to FIG. 1, there is shown apparatus embodying several aspects of the invention. Generally illustrated by numeral 2 is a vertical framework of structural steel beams or channel bars, and associated apparatus which comprise a side sealing mechanism, that is, a mechanism which provides a side seam extending the length of the bundle. Indicated generally by numeral 4 is a second vertical framework which together with associated apparatus comprises an end sealing mechanism. Mounted on a platform of the end sealing mechanism is an exemplary bundle of cloth 6 (in this instance being shown as a roll) already sealed laterally in a horizontal diametrical plane, and with its end folds 8 at one end in a position on the end sealing members of the end sealing apparatus to be sealed thereby. The other end of the roll 6 is shown with its ends sealed at 10. A succeeding roll 12 is shown mounted on an exit platform of the side sealing mechanism 2, and, in dotted lines, at 14 is shown a still succeeding roll about to be advanced into the side sealing mechanism 2 for side sealing.

Throughout the drawing, conventional elements such as nuts and bolts or welding means or other means of attachment are not illustrated in order to preserve the clarity of the drawings. Where such fastening means are critical to the invention, or other mechanical features are critical to the invention, they will be specifically pointed out.

Referring now to the side sealing mechanism 2, it comprises a pair of upstanding sheet metal sides 16 held in parallel spaced apart relationship in customary manner by means of the steel girders 18. (Other girders, not shown, assist girders 18 in maintaining the side plate 16 in their relationship). The side plates rest upon the floor in customary manner, for example, on base pads 20.

Vertically adjustably mounted between vertical guide members 22 (see FIG. 2) which are suitably fastened to the side plate 16 is a framework (generally indicated by numeral 23) formed of steel box beams, the framework having a top beam 24, a bottom beam 26, and the side beams 28 and 30. (See FIGS. 2 and 3.) The top beam 24 is in itself composite, and is made up of the side-by-side box beams 32 as shown in FIG. 3, which are attached to each side of the upper ends of the side beams 28 and 30.

Mounted on the lower end of each of the side plates 16 are the cylinders 34 and 36 (see FIG. 4) which are fluid operated, preferably being hydraulically operated, and having extensible pistons 38 and 40. The ends of these pistons are attached by means of brackets 42 and 44 which are attached by suitable means to the side beams 28 and 30 and extend through suitable vertical slots (not shown in the side plates 16 so that the brackets can move vertically with respect thereto). When the pistons 38 and 40 are actuated by their respective cylinders 34 and 36, the motion of the pistons will raise or lower the entire side sealing framework comprising the member 24, 28, 30 and 26.

Figure 4:
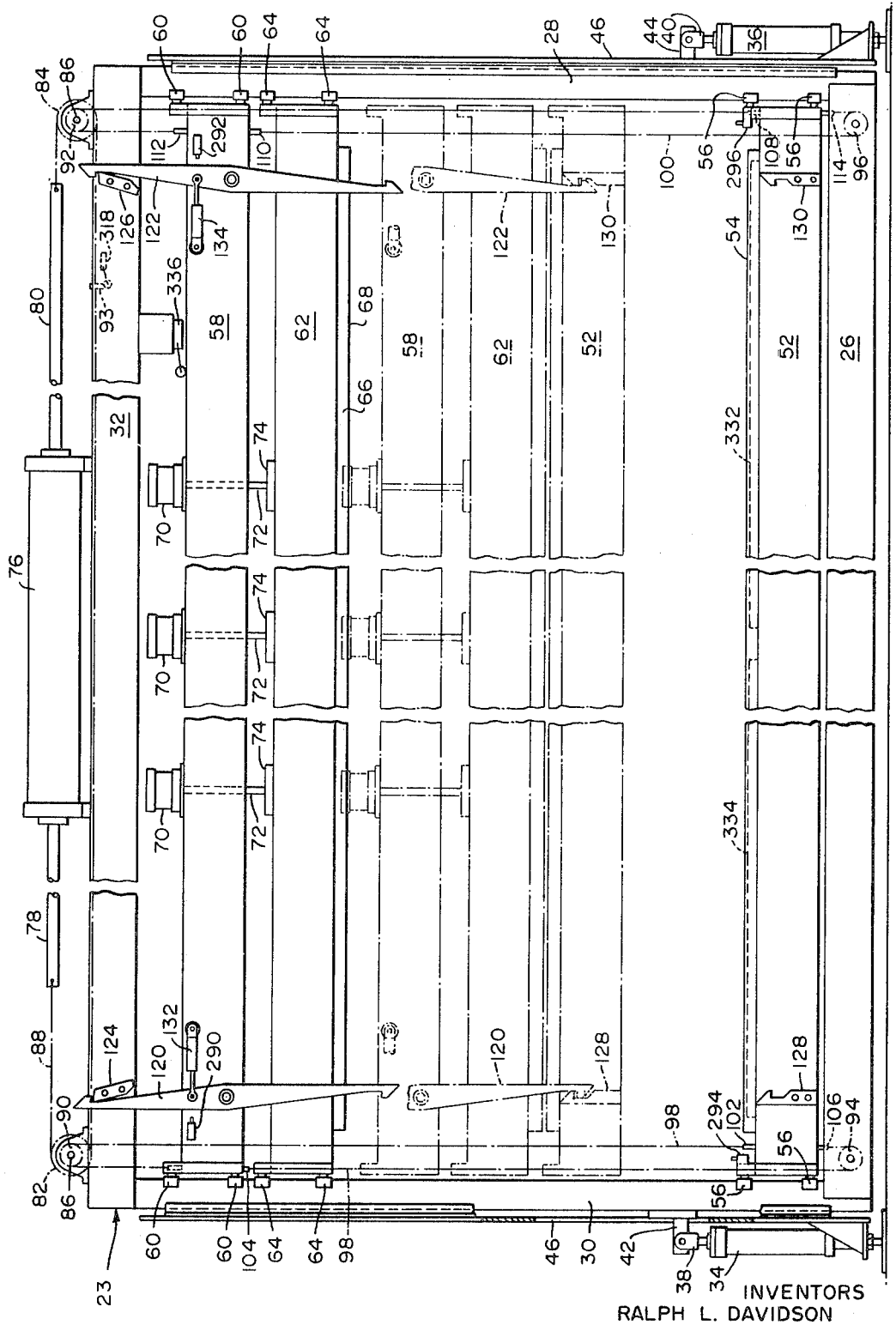
FIG. 4 is a front elevation of the side sealing mechanism, with other parts of the apparatus removed in order to provide greater clarity of illustration, this drawing showing the parts in two operating positions (one full line and one dot-and-dash line) in order to illustrate the action of the safety latches.

The elongated side sealing bars or beams which are movable toward and away from each other for sealing operations are carried and guided by the side beams 28 and 30. Referring first to the bottom side sealing beam 52, it comprises a structural box beam of generally square shape, as shown in FIGS. 3 and 4, on which is mounted for its entire length an elongated heating bar 54. Heating bar 54 is of the type that may be almost instantaneously heated by electrical current to a temperature which will heat the plastic sealing material to its fusing temperature. That is, it is an impulse heater and is readily available on the market, for example, from Vertrod Corporation, 2037 Utica Avenue, Brooklyn, New York. The bar 52 has at each end a set of guide wheels or rollers 56 which are suitably mounted on shafts fastened to and extending from the ends of the beam 52 in conventional manner, these guide wheels straddling the upright beams 28 and 30. By this means, the bottom sealing beam 52 is guided in its upward and downward motions with respect to the framework 23 as a whole.

The upper sealing beam is also composite in that is comprises a top sealing beam 58 generally like bottom beam 52 and a lower beam 62. Top beam 58 is guided by the side members 28 and 30 as is the bottom sealing beam 52, that is, sets of guide wheels or rollers 60 are provided at each end of the beam 58, these wheels extending on shafts suitably mounted on and extending from the ends of the beam and straddling the side members 28 and 30 so that the top beam is guided in its upward and downward motion with respect to the entire framework itself.

The lower sealing beam 62 is similarly guided on the struts 28 and 30 by means of the wheels or rollers 64 similarly mounted at each end of the beam 62 and straddling the upright members 28 and 30. Mounted on the bottom surface of the beam 62 is an elongated pressure pad 66 on whose bottom surface is mounted the cutting wire 68. (When the sealing beams are together for sealing, the heater 54 raises the plastic sheet to its fusing point and compress it against pad 66.) Wire 68 severs the fused-together material while leaving portions of the material on each side of the wire fused together.

Mounted on the top surface of beam 58 is a plurality of short stroke cylinders 70 (in this instance three) whose pistons extend downwardly and are attached to and support the beam 62.

When the upper bar 58 is moved downwardly (as described below) to accomplish a side sealing operation, it and beam 62 stop with the cutting wire 68 about a half-inch away from the heating bar 54. At that point, the lower bar 52 and upper bar 58 will be locked together by latches described below, and the additional motion of bar 62 to accomplish sealing is provided by actuating the short-stroke cylinders 70 which will extend their pistons 72 and thus supply the motion to bring pad 66 and wire 68 against bar 54 to accomplish sealing.

Mounted on the upper cross members 32 by suitable cross members is fluid cylinder 76 having a single piston with one end 78 thereof extending to the left (as shown in FIG. 4), and the other end 80 extending to the right. Also mounted on beams 32 at each end of the framework are sprocket wheels 82 and 84, the sprocket wheels being attached to axles 86 and being conventionally journaled in suitable bearings as shown. A sprocket chain 88 has one end attached to the end of 78 of the cylinder piston, is trained around the sprocket wheel 82, extends to sprocket wheel 84, is trained therearound, and has its other end attached to piston end 80 as shown. Also attached to the axles 86 and rotating with the respective sprocket wheels 82 and 84 are the sprocket wheels 90 and 92. If desired, the sprocket chain 88 can extend around the sprockets 82 and 84 and then have its ends joined by an elongated solid rod whose ends are fitted with turn-buckles to adjust the chain tightness.

A follower 93 is attached to the bottom reach of chain 88 or, if alternatively used, to the said elongated rod.

Mounted on the bottom framework member 26 are the sprocket wheels 94 and 95, suitable bearing means being provided for this purpose. Trained on the sprocket wheels 90 and 94 is the elevator sprocket chain 98; and trained on the sprocket wheels 92 and 96 is the elevator sprocket chain 100. Each of these chains makes a loop around its respective pair of sprocket wheels.

Referring to the sprocket chain 98, one end thereof is fastened by means of fastening stud 102 to the top of bottom sealing beam 52. The chain extends upwardly, around the sprocket wheel 90, and then is attached by means of a suitable stud to the top of top beam 58. Chain 98 is attached to the bottom of bar 58 by the stud 104, and extends downwardly, encircles the bottom sprocket wheel 94, and is then attached by stud 106 to the bottom bar 52.

In like manner, chain 100 is attached by stud 108 to the top of the other end of bar 52, extends upwardly and is attached to the bottom of top bar 58 by stud 110. The chain is attached to the top of bar 58 by stud 112, and extends upwardly to encircle the sprocket wheel 92 and then extend downwardly. It encircles the sprocket wheel 96 and is attached to the bottom of bar 52 by stud 114.

With the connection thus made, when the cylinder 76 is actuated to move the piston ends 78 and 80 to the left, chain 88 rotates the sprocket wheel 90 and 92 counterclockwise with the result that sprocket chain 98 pulls the lower sealing beam 52 upward while chain 100 lowers the upper beam 58.

An opposite actuation of the cylinder 76 will cause the pistons 78–80 to move to the right, thus reversing the rotational direction of the sprocket wheels, and moving upper beam 58 upward and lower beam 52 downward.

Mention has been made above of the safety features, and these will now be described. Pivotally mounted on the end portions of the upper beam 58 are the plain levers 120 and 122. Levers 120 and 122 have hooks provided at each end, as clearly shown in FIG. 4. Mounted on the stationary top frame bar 32 are the pair of detents 124 and 126 adapted to be engaged, respectively, by the hook ends of the lever arms 120 and 122. This engagement of the upper hook ends of the levers with the respective detents occurs when the upper beam, and thus the dependent lower sealing beam 62, is at their topmost position.

Mounted on the lower sealing beam 52 are the detent members 128 and 130. The lower hook ends of the levers 120 and 122 are adapted to engage detents 128 and 130 when the upper beam 58 (with dependent beam 62) and the lower beam 52 are in a sealing position as shown by the dotted lines in FIG. 4. At this position, when the upper sealing beam 62 is moved by the pistons 72 against the bottom selaing beam 52, the levers 120–122 serve to lock the bars together and thus take the stress and strain of the heat sealing operation away from the respective elevator chains 98 and 100.

Similarly, when the beam 58 is in its uppermost position with the levers 120–122 engaging the respective upper detents 124–126, the upper beam 58 is supported thereby and cannot accidentally drop if, for example, the chains 98–100 should break or should some other circumstance cause the upper beam to try to drop freely.

Actuation of the lever arms 120 and 122 is caused by respective cylinders 132 and 134. Each of the cylinders is operated by a solenoid valve 133 which is provided with a spring return. Actuation of the valve moves lever 120 counterclockwise (as drawn in FIG. 4) about its pivot point, and lever 122 clockwise about its pivot point. That is, the two levers are biased by the solenoid valve so as to be in detent engaging position. When the solenoid valve is actuated, the levers are free from their respective detents. Referring to FIGS. 2 and 3, mounted on a cross bar 140 which spans the end plates 16, is an extending support member 142. An upright plate 144 is attached to support 142 and has pivotally attached thereto the ends of two arms 146 and 148 of the parallelogram structure, the other ends of these arms being attached to end plates 150 of a pusher element indicated generally by numeral 152. Conventionally mounted between the front edges of the plates 150 on suitable end bearings is a plurality of roller 154. A cylinder 156 is pivotally mounted on a bracket at the end of arm 142, with its piston being attached to arm 148 by a suitable clevis. When the cylinder 156 is actuated to extend its piston, the pusher element 152 is moved in an arc downwardly and to the left as shown in FIG. 3, to meet the exemplary roll 14 which is resting on a conveyor system 158. Because of the parallelogram arrangement, the face 154 remains vertical, and thus regardless of the size of the roll 14, some portion of the face will engage the roll and move it from the position shown in FIG. 3 through the opening in the sealing framework 24–30 to the position shown by roll 12. As mentioned above, when this happens, the roll being moved through the framework carries with it the sheet of film with which the article is to be wrapped.

Mounted near the top of the machine on the exit side is a supply roll 160 of the film to be used for wrapping the articles. Preferably a reserve supply roll 162 is also provided, both rolls being mounted in suitable bearings so that when roll 160 is exhausted, roll 162 can be moved into its place. From roll 160, the film 164 moves across suitable guide rollers mounted just beneath beams 32, and eventually moves downwardly as shown, in a plane at the right-hand face of the plane of the sealing framework. In similar manner, a pair of rolls 166 and 168 (roll 168 being a reserve supply) are mounted on suitable bearings near the bottom of the frame on the entrance side, and a sheet of film 170 from roll 166 is guided upwardly by means of suitable guide rolls until it meets the leading edge of film 164. It will be noted that the two adjacent edges of the films 164 and 170 have previously been heat sealed at 172 to form a continuous sheet extending across the inlet opening in the sealing frame. When a roll such as roll 12 (which formerly rested on the conveyor 158) is pushed to the position shown in FIG. 3 it carries the joined-together films 164–170 so that the films partly envelop the roll. In so doing, it will be noted that a guide roller 174 at the bottom edge of the sealing beam 62 guides the film 164 around this edge, and also permits a smooth downward traverse of the beam 62 to wrap the film around the parcel. A similar guide roller 176 is placed at the inner edge of the entrance platform 178 to guide the film coming from the roll 166. A guide roller 180 similar to roller 174 is mounted at the upper edge of the sealing beam 52 to guide the film 170 as the bar 52 rises to perform a sealing function in connection with the beam 62.

A movable conveyor belt 158 is provided and is of conventional structure. In general it is trough-shaped in order to hold a roll such as roll 14 resting securely thereon. The belt extends at each end over suitable rollers 182 and is positioned to carry bundles, to be wrapped, to a position in front of the apparatus.

An entrance platform 178 is fixed by conventional means immovably at the entering side of the apparatus at a fixed height in reference to the floor supporting the whole machine. It is adjacent the conveyor 158 so that the roll 14 may be pushed from the conveyor and onto the entrance platform by the pusher 152.

Referring now particularly to FIGS. 2 and 3, a movable exit platform 190 is shown mounted conventionally on rollers 192 on suitable fixed tracks 193, one at each side of the exit platform, so that the platform may move from its position (shown in FIG. 3) closely adjacent the entrance platform 178 to the position shown in dotted lines and indicated by numeral 194. The position 194 is such that when the platform 190 is in that position, a sufficient clearance is obtained between the adjacent edges of the entrance and exit platforms to permit the passage of the sealing beam 52 up therebetween for a sealing operation. The exit platform is moved from right to left and vice versa by a fluid-operated cylinder 196 having one end attached to platform 198, and the end of the piston of which is fastened to a downwardly projecting lug on the exit platform 190. Track 193 is supported at one side of a framework 198 which may be constructed, see FIG. 1, of structural iron of sufficient rigidity to hold the several parts, bearing in mind that rolls weighing up to several hundred pounds can be packaged on the apparatus.

The frame 198 includes both the box-shaped platform position 193 as shown, and also an exit structure in which the end girders or struts 200 and 202 are so assembled as to present a V opening at each end, all as shown in FIG. 1.

Mounted between the ends 200 as will be further described below, is a generally rectangular movable platform 204 which, like the rest of the framework, may be made of structural iron. Carried at the center of this platform is a turn-table bearing 206 (see FIG. 3), and on the upper surface of the platform are carried the four rollers 208, these being angled as shown in FIG. 2 toward each other. Rotatably mounted on the rollers 208 is a square platform 210, the platform being fastened to a conventional spindle 212 which is journaled in the bearing 206. A pulley or sprocket wheel 214 is mounted to the spindle 212, and a sprocket chain or belt trained thereon is driven by a suitable motor 216 (either electric or air) to rotate the table 210.

Mounted on the rotatable table 210 is a pair of platforms 218 and 220, mounting being provided in conventional manner by the reinforced mounting plates 222. Mounted between the platforms 218 and 220 are a pair of inclined roller-type platforms 224 and 226, these being inclined toward each other in order to make a trough adapted to receive a roll 6. Because of the roller construction of these platforms, a roll 6 can be readily moved toward and away from the end sealing structure 4.

Pivoted at a point 228 is a table 230 (see FIGS. 2 and 3) extending from the left edge (as viewed in FIG. 3) of the frame 193 and positioned to be overlapped by the exit platform 190 in the left position thereof. The left edge 232 (see FIG. 2) of the platform or table 230 is curved, and in similar manner the outer edge of the platforms 218 and 220 are curved, to match the curvature 232.

The platform 204 is supported by a plurality of sprocket chains as follows: Sprocket chain 234 (see FIG. 1) is attached to the lower bar 26 of the adjustable frame 24–30. It then is trained over the wheel 236 (see FIG. 3) under pulley 238, around pulleys 240 and 242 and has its end attached to one corner of the platform 204. A parallel chain 244 and lying adjacent chain 234 is also attached to the beam 26 adjacent to the attachment point of chain 234, is trained over an adjacent pulley 236' under adjacent pulley 238', around adjacent pulley 238' over pulley 246 and has its end attached to the opposite corner of the platform 204 as shown in FIG. 3. In exactly the same manner the other end of the platform 204 is supported by a pair of parallel chains (not shown).

As a result of this construction, when the sealing frame 24–30 is moved upwardly to adjust the meeting place of beams 58 and 62 to be approximately at the center plane of a large bundle, the platform 204 moves downwardly a matching distance so that end sealing will be at a center plane. Or, when the sealing frame 24–30 is adjusted downwardly to seal a smaller roll of material, the platform 204 is moved upwardly a corresponding distance.

A chain 248 is attached at one end to the edge of table 230 as shown to support the table, is then trained over pulley 250, beneath pulley 252, and is then attached to the underside of the platform 204. Thus, when the platform 204 is lowered by the upward action of the sealing frame 24–30, the end of the table 230 drops a corresponding distance.

It will be observed upon examination of FIG. 3 that the leaves 218 and 220 of the movable end sealing platform are so positioned above the level of the platform 210 that the leaves lie adjacent the curved end 232 of the platform 230 but are not in engagement therewith. Thus, the rotation of the platform 210 on the rollers 208 is not prevented, but when the entire table structure 204, 208, 210, 218, 220, 224 and 226 moves downwardly, for example, the leaves 218 and 220 are basically kept in the same relationship to the platform 230 so that the roll 12, when moved off the exit platform 190 will first roll onto platform 230 and thence onto the pertinent leaf (218 or 220 as the case may be) and down into the trough formed by the roller platforms 224 and 226.

Referring now to FIGS. 1 and 3 in particular, and end sealing mechanism is shown comprising a framework having the top, bottom and side members respectively 256, 258, 260 and 262, the frame members being conventional steel box beams. This framework as an entirety is fastened at one side to the cross bars 18 which span the plates 16; and as is customary, the framework rests on suitable shoes or pads on the floor which supports the remaining portions of the machinery. Preferably, a diagonal strut 264 is used to brace the framework thus provided. Extending laterally between the side members 260 and 262 is the cross member 266, on which is mounted a heat sealing bar 268 similar to the impulse heating member 54 which is provided on the sealing beam 52. It will be observed that member 268 is at a fixed distance above the floor which supports the whole machine, and may be, for example, conveniently about 30 inches above floor level. Thus, the end sealing of the bundle of goods will always be made at a given height above the floor. It is for this reason that the lazy-susan platform which supports the roll for end sealing is movable downwardly or upwardly, respectively, as the side sealing framework is moved upwardly for large rolls and downwardly for small rolls. For example, if a small diameter roll is to be sealed, then in order to have the lateral seam extend on the horizontal diametrical plane thereof, the bottom frame 52 is moved downwardly in order to accomplish this. By moving bottom frame 24–30 downwardly to accomplish this effect, the result is to raise the platform 210 so that approximately the center line of the roll will be at the same level above the floor as is the heat sealing bar 268. Correspondingly, if a large roll is to be sealed, then the framework 24–30 is raised upwardly to accomplish sealing at the center horizontal plane, with the result that the platform 210 is lowered a corresponding distance so that again the roll will have its central plane approximately level with the heat sealing bar 268.

Mounted on top of the upper member 256 of the end sealing mechanism is a plurality (three in this instance) of fluid-operated cylinders 270, pneumatic or hydraulic, whose pistons support by suitable attaching means a top movable sealing bar 272. On sealing bar 272 is mounted the elongated pressure pad 274 which, like the pressure pad 66, has running along its length a cutoff wire 276. The bar 272 is shown in its downward position in FIG. 3 with the sealing pad 274 in engagement with the heater bar 268.

The bar 272 is guided on the uprights 260 and 262 by suitable rollers or wheels 278 (see FIG. 3) at each end of the bar which are mounted on conventional shafts supported by the plates 280 attached to the bar 272. The wheels slide up and down against the members 260 and 262 and are held in engagement therewith by means of the retaining covers 282 which are fastened by suitable means to the uprights 260 and 262.

Mounted at the exit side of the end sealing mechanism is a conveyor belt 284 which is adapted to carry away from the apparatus bundles that have been completely wrapped and sealed.

Throughout the apparatus, control switches are placed as follows:

Referring first to FIG. 4, at each end of beam 58 (in position to be actuated by the levers 120 and 122 when the levers are moved to their unlatch positions) are the switches 290 and 292 respectively. The contacts of these switches are normally open when the latches are closed.

Mounted at the ends of beams 52 are the switches 294 and 296, these switches being actuated (to close their contacts) upon striking suitable abutments adjacent the under side of beam 62 when the sealing beams have moved together.

Mounted on support bar 142 (see FIG. 3) is a switch 300, the switch being actuated by motion of the pusher arm 146. This switch has two pairs of contacts. One of these pairs (302) is normally open and is actuated to close the contacts when the pusher arm is three-quarters through its stroke, that is, the roll being pushed has already reached the exit table 190. The other pair of contacts (304) is normally closed and is opened by the pusher arm when the pusher is one-quarter of the way retracted from its furthermost forward stroke.

Mounted on support 142 is a switch 306 having two pairs of contacts 308 and 310. Both pairs of contacts 308 and 310 are held closed, but are opened by the pusher when it moves to eject a roll into the machine.

Mounted at the exit end of conveyor 158 is the switch 312 having two pair of contacts. One pair of contacts 314 is normally closed and is opened by a roll 14 reaching the position to be moved into the machine, and the other pair 316 being normally open but being closed when contacts 314 are opened.

Mounted on a suitable support attached to the cross members 32 is a switch 318 in a position to be actuated by the follower 93 when the piston 78–80 is in its right-hand position (as viewed in FIG. 4), when the sealing beams are together for a sealing operation. The contacts of this switch are normally open and are closed by the follower when the sealing beams come together.

Mounted on frame 198 in position to be actuated by exit platform or table 190 are two switches 320 and 322. With the table to the right i.e., over seal beam 52) as viewed in FIG. 2, switch 320 is open and switch 322 is closed. When the table moves to the left, switch 322 opens and switch 320 closes. When the table moves to the right again, switch 320 opens and switch 322 closes.

Mounted at the end of the frame 204 is a switch 324 having a normally open contacts. Mounting may be done by conventional methods, but the switch is so positioned when an end-sealed bale or bundle emerges from the sealing cradle, the contacts of switch 324 are momentarily closed.

Mounted at the ends of the end sealer cross bar 266, but in position to be actuated by the end sealing beam 272 when the latter is in its lower (or sealing position, are the two switches 326 and 328. These switches have normally open contacts which are closed by actuation of the switches by beam 272.

Mounted on a bracket 331 the frame 204 is a switch 330 having normally closed contacts. It is so positioned that its contact arm 333 is actuated by a cam plate 335 (see FIG. 2) attached to the under side of table 210. When the table has rotated to position that a bundle supported by it is orientated to be in proper position to have end sealing done, the cam plate opens the contacts of switch 330. A similar cam plate is located at the diametrically opposite corner of plate 210 and functions the same way.

Mounted on top of the sealing beam 52 in end-to-end relation are a pair of what are called "tape switches" 332 and 334. These are elongated switches actuated by pressure at any place along their length. Their contacts are normally open, and the top surface of the switches is below the top surface of the heater bar 54. If the sealing bars should come together with anything between them other than the thin plastic sheet material, such as for example, a failure for a bundle to be pushed all the way through the machine or an operator's hand or arm, the contact will close the particular type switch which is pressed against by the obstruction.

Mounted beneath the top beams 32 in a position to be actuated by the top sealing beam 58 at its uppermost position, is a switch 336. This switch has normally open contacts which open when the beam 58 descends. When the beam returns to its upper position, the contacts of switch 336 close.

Referring now to FIG. 6, the fluid-powered system of the apparatus is schematically shown. In the drawing the straight connecting lines indicate suitable piping or hose. Air (at a line pressure sufficient to power the pistons which operate the several movable mechanisms of the apparatus) is provided at 350, and passes via filter 354 and pipe 351 to the air reserve tank 352. Through pressure regulator 356, and lubricator 358, air passes via pipe 360 to solenoid valve 362 which controls (through pipes 363 and 365) cylinder 76 to actuate the side sealing beams. Valve 362 is a two position, four-way valve, solenoid-actuated in one direction, spring-return to the original position. Unless otherwise stated, all valves used are of this kind, and are, for example, Type SS–2030 made by Parker Hannifin Corp., 17327 Euclid Ave., Cleveland, Ohio.

The air line feeds into the manifold 364 and thence via pipe 366 to valve 368. Valve 368 controls the double-acting pusher cylinder through suitable piping as shown.

Throughout the system, where needed, the adjustable restriction combined with the bypass, shown at 370–372 in all cases, is used.

From manifold 364 a pipe 374 connects the air supply to valve 376. From the latter, a pipe 378 connects the valve (when in one position) to manifold 380 from which pipes lead to the longitudinal or side sealing pressure cylinders 70. From valve 376 a pipe 382 leads to manifold 384 and thence by suitable piping to the same cylinders but on the other side of the pistons of these cylinders to feed air thereinto when valve 376 is in its other position.

From manifold 364, a pipe 386 leads to valve 388. This valve is solenoid actuated in two positions (as contrasted to the spring-return valves used in the rest of the system) and has the solenoids 389 and 391. From valve 388 by suitable pipes as shown, air is led to one side of the piston of cylinder 196 when valve 388 is in one position, and to the other side of this piston when the valve is in its other position.

Also from manifold 364, by pipe 390, air is led to valve 392. A pipe 394 leads air to manifold 396 when the valve is in one position, and pipe 398 leads air to manifold 400 when the valve is in the other position. From manifold 396 three suitable pipes lead air to one side of the pistons of end sealing cylinders 270; and from manifold 398 suitable pipes lead air to the other side of these pistons. Valve 388 is Type SS–4030 made by said Parker Hannifin.

Figure 5:
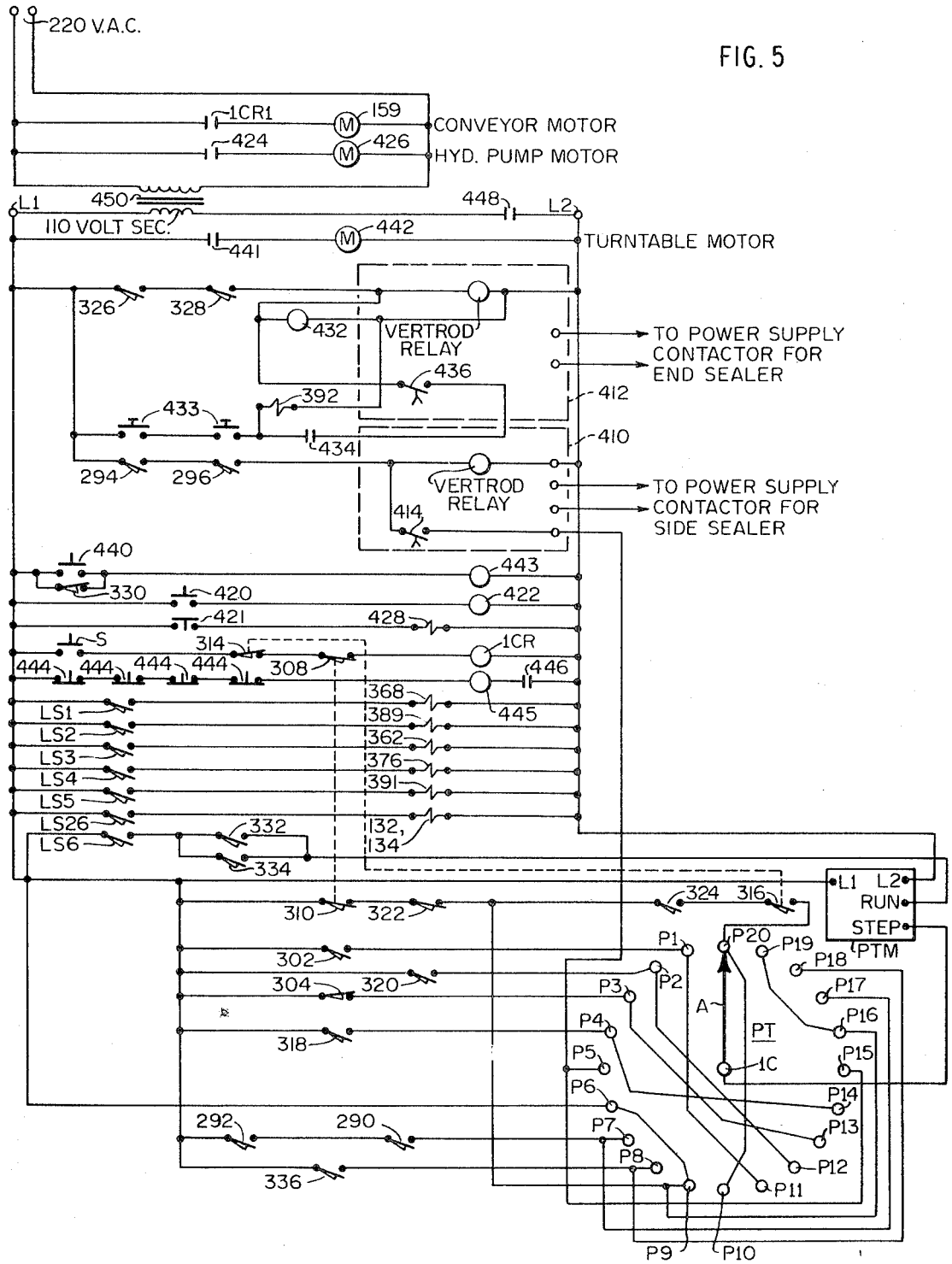
FIG. 5 is a schematic electrical wiring diagram for operating the FIG. 1 embodiment.

In FIG. 5 is shown a schematic wiring diagram of the apparatus as wired for automatic cycling. That is, so long as rolls to be covered are delivered to the conveyor belt in succession, the whole system will cycle to seal the bundles along the horizontal mid-plane longitudinally. The end sealing is done semi-automatically by the machine operator, and automatic cycling of the side seal is interrupted while end seals are being applied, and thereafter resumes automatically.

In the diagram convention wiring and switch symbols are used as standardized by National Electrical Manufacturers Association and The Joint Industrial Council. In the diagram, where wires cross each other, the standard convention is used that no electrical connection between crossing wire is made, unless the crossing point is provided with a black dot. Relay coils are shown as circles.

A program timer is used of the lobe and stepped kind. That is, the lobes actuating the timer switches are carried on a rotor which is successively "stepped" or incrementally rotated each time an electrical impulse is applied to the motor operating the rotor. One or more predetermined timer switches is actuated by a lobe or lobes (respectively) at each stepped position of the rotor.

The program timer actually used is one made by Automatic Timing and Controls Incorporated, having its place of business at King of Prussia, Pennsylvania, and is Type No. 1812 A–01 –Q–20 A. In the drawing, the rotor of the timer is indicated schematically by PT and has 20 positions indicated by the numerals P1 to P20 in the circles. The internal timer switches actuated by lobes of the timer are designated as LS1, LS2, LS3, LS4, LS5, LS6 and LS26 to distinguish them from switches mounted externally of the timer. The timer motor is indicated schematically by the square indicated by the symbol PTM and has indicated in it schematically the terminals L1, L2, RUN and STEP. The power line is connected to L1 and L2. Stepping of the timer is caused by applying electrical power to STEP from one side of the power line. If the same side of the power line is applied to RUN, the timer is rotated continuously through all the timer positions until the power is removed from RUN. The arrow A schematically indicates a connection from a given position to the relay coil 1C of the timer which connects to STEP. As will be seen later, this feature of this standard timer is used as part of a safety feature of this invention. The operation and electrical connections of the whole timer are well known to persons skilled in the art and the operation details thereof readily available from the said manufacturer thereof.

Referring now to the diagram, the following assumptions are made:

There is no roll on machine; the switches are as shown in the diagram; the conveyor has roll on it at beginning end; the sealing beams 52 and 58–62 are open, that is, separated to their maximum; the exit table 190 is in position over sealing beam 52 in position to receive a bale or roll of material. The program timer PT is in its home position, that is, the internal connection A is at position 20. The end sealer platform 224–226 has a roll on it about to be shoved from the platform.

To start a sealing cycle, start switch S is manually closed and stays with its contacts closed until it is manually opened. Closure of S applies power to relay coil 1CR through switches 314 and 308, which are, respectively, a set of contacts in switches 312 and 306. Actuation of 1CR closes contacts 1CR1 which energize the conveyor motor 159. The conveyor belt then delivers a roll to the entrance of the machine, that is, in front of the sealing beams 52 and 58–62. At this position, the roll opens switch 314 to stop the conveyor. Switch 316 is closed by the roll at the same time. When the doff switch 324 is now momentarily closed by the operator pushing a roll off platform 224–226, this completes circuit from one power line through switch 310, 322, 324, 316, P20, coil 1C, and to STEP on PTM. Power to PTM is delivered to L2 from the other side of line. This steps PT to position P1 and closes switch LS1 which feeds power to pusher solenoid valve 368, and cylinder 156. Cylinder 156 causes the pusher 148 to push the roll through the machine onto exit table, drawing the sealing sheets with it. When the roll leaves the conveyor, switch 316 opens again and switch 314 closes, but motion of pusher 148 opens switch 308 as well as switch 310 so the conveyor can't run while the pusher is extended. Opening of switch 310 prevents the exit table from moving while roll is being transferred.

When pusher 148 gets three-quarters of its way through its total motion to the left as viewed in FIG. 3, so that the roll is on exit table, this closes contacts 302 of the single pole double throw switch 300, which in turn steps PT to position P2 and closes switch LS2, stepping being through position P1 and 1C. At the same time, switch LS26 is closed by the PT lobe in position P2, which energizes the solenoid of solenoid valve 133. Energizing this valve actuates cylinders 132, 134 to pull the safety levers 120–122 off their detents. (Switch LS26 is kept closed through lobe positions P2 and P3 and is not opened until the PT is stepped to position P4.) When the latches are pulled away from their detents, the safety switches 292 and 290 are closed to establish the fact that the latches are clear of their detents.

When LS2 is closed, it also actuated the exit table solenoid valve 388–389 to cause cylinder 196 to move the exit table away from the seal beams toward the end sealer mechanism. When PT steps to position P2, it also opens LS1 and this takes power off the pusher solenoid valve 368. The spring-return of the pusher valve now starts to move the valve back so as to cause cylinder 156 to retract the pusher. This retraction clears the pusher out of the path of the seal beams, and recloses switches 308 and 310.

Motion of exit table away from sealing beam 52 closes switch 320 and steps PT to position P3 via P2 and 1C. When PT goes to position P 3, it closes switch LS3 which energizes solenoid valve 362 causing cylinder 76 to close the sealing bars, this being permitted by the released safety latches, which are still being held in their released position by the closed switch LS26. Switch LS3 remains closed until PT reaches position P8. LS3 is held closed until PT moves to position 8. When the pusher is one-quarter of the way back to its rest position, it closes switch 304 which steps PT to position P4 via position P3 and 1C. On stepping to position P4, the PT lobe releases switch LS26 which opens. This puts the safety latches 120–122 in a latch closing position, which happens when the sealing beams are in their closed position. (These latches thereafter take the sealing pressure). At the same time, stepping of PT to position P4 closes LS4 which energizes solenoid valve 376 to actuate cylinders 70 to apply sealing pressure. Meanwhile, with the closing of the sealing bars, switches 294 and 296 on the bar 52 have been closed, and also switch 318. Actuation of 318 steps PT to position P5.

Closing of switches 294 and 296 actuates the Vertrod heat control unit 410 which applies heat to the heater 54. The Vertrod unit is made by Vertrod Corporation of Brooklyn, New York, Type 168 PCS Heater Bar and Pressure Bar Unit. Any other similar unit may be used provided it is capable of handling the power needs of the heater 54 (approximately 4,500 watts), and has a timer which will time the length of time the heat is applied (approximately 1 to 4 seconds depending on the thickness of the sheet material being fused together). Vertrod unit 410 has a relay 414 therein (indicated schematically) which, at the end of the heating cycle, is closed by the unit to step PT from position P5 to position P6. The PT lobe in this position again closes switch LS 26 to open the safety levers 120–122 and release the sealing beams. In position P6, the closing of switch LS6 steps the PT to position P7, with LS26 being held closed. Since switches 292 and 290 have been thereby closed, timer PT is then stepped to position P8, in which position LS26 still remains closed to hold the safety levers out of their detents.

With the safety levers out of their detents and with switch LS3 being opened when PT goes to position P8, the spring-return on the solenoid valve 362 actuates cylinder 76 to return the sealing beams to their starting (or open) position. When the beams reach their open position, switch 336 is again closed by the upper beam, thus stepping PT to position P9. In position P9, the PT lobe again closes switch LS5 to bring the exit table back over the lower sealing bar so as to be positioned to receive another roll. In this position, the exit table has reclosed switch 322. Also, the program timer PT is stepped via closed switch 322, switch B10 (closed when the pusher retracted) P9 and 1C to position 10, which is interconnected to position 20. Thus, positions 10–19 correspond to a second cycle, working successively through these positions.

In the meantime, a second or successive roll has been brought to the front of the machine by the conveyor which now was restarted by the closed switches 314 and 318 when the pusher retracted. The pusher is again now automatically cycled to push the second roll through the open sealing beams, and the above automatic cycling for longitudinal or side sealing takes place through the PT positions P10 to P19, always subject, of course, to the signal that the lazy-susan table is clear. At the close of cycling for this second roll, PT is stepped to P20 the initial position. The third roll is now sealed automatically, and so forth. In each case, the succeeding roll pushes the preceding roll off the exit table and into the end sealer mechanism. End sealing is now done under the manual control of the operator, but the sealing cycle of the machine described above for the longitudinal or horizontal side seal does not start until the doff switch 324 is closed by the ejection of the roll from the end sealing cradle or lazy-susan.

Manual operation of the end sealing is performed under the control of the operator. The adjustment of the height of the lazy-susan will already have been done, because when the sealing frame 23 which supports the sealing beams 52 and 58–62 is adjusted either upwardly or downwardly to bring the meeting point (for sealing) of these sealing beams to approximately the horizontal mid-plane of the roll or bundle, this motion respectively lowers or raises the table 208 by the chain drive comprising chains 234 and 244 on each side of the end sealer. This adjustment of frame 23 is done by means of momentary contact switches 420 and 421 each of which is normally open. When switch 420 is closed, relay 422 is connected across the line, so that the contacts 424 thereof are closed to energize the motorized hydraulic pump 426. Fluid under pressure from pump 426 energizes the cylinders 34 and 36 to raise the frame 23. That position at which the height of the line at which the sealing beams meet will be approximately at the horizontal mid-plane of the bundle. (Of course, if desired, other vertical heights can be selected.) To lower the frame, switch 421 is closed which connects across the power line a solenoid valve 428 which bleeds the fluid from the cylinders back to the fluid supply tank (not shown). The weight of frame 23 will cause the frame to move slowly downwardly to the desired position, at which point the switch 421 is opened.

The operator now drapes the end folds 8 over the fixed end-sealing heating element 268, and by closing both of series switches 433 actuates solenoid valve 392. This causes the top end sealing bar 272 to be lowered by cylinders 270 via air from manifold 394 (see FIG. 6) until the bars are close enough to seal, at which position top bar 272 closes the switches 326 and 328, switches 433 having been held closed up to this point. Closing switches 326 and 328 in turn energizes the Vertrod unit 412 (Type 84 PCS Heater Bar and Pressure Bar Unit made by said Vertrod Corporation) and also energizes the relay coil 432, which closes its contacts 434 which establishes an auxiliary or lock-in connection from the solenoid 392 to the line (but through a relay 436 in the Vertrod unit which has previously been energized to closed position when closing switches 326 and 328. Therefore, when switches 433 are released by the operator, the solenoid valve 392 is electrically locked in and remains energized to maintain sealing pressure, but only so long as the relay 436 keeps its contacts closed.

After the proper heating time has elapsed, relay 436 opens its contacts, which deenergizes solenoid valve 392, and its spring-return moves it back to the position to actuate cylinder-pistons 270 in an upwardly direction to lift the sealing beam 272. This motion opens the switches 326 and 328 to deenergize the Vertrod unit 412 and relay coil 432, thus opening the contacts 434 to open the auxiliary connection to the solenoid 392. Relay 436 in the Vertrod unit also opens its contacts.

One end of the roll having been sealed, the operator now manually closes switch 440 which energizes motor 442 through relay 443 and its contacts 441 to turn the lazy-susan platform 210 and thus the roll. Switch 440, as explained above, is held closed until the platform has rotated several degrees, at which point the switch 330 closes to shunt across switch 440. This maintains the circuit to motor 442 until the table (and the roll carried thereon) has rotated 180° at which point, switch 330 opens and the motor 442 stops.

The operator now end seals the other end of the roll, and shoves the roll off the end sealer platform. This closes doff switch 324, thus completing the circuit first described above, which permits switch 316 to step the program timer from position 20 to position 1 (as first described) or from position 10 to position 11 for a successive roll. Sequencing then follows as described above.

An important safety feature (among others) has been provided, as follows:

On the top of the lower sealing beam 52 are mounted the tape switches 332 and 334. They are placed in end-to-end relationship, and are connected in parallel between switch LS26 and RUN terminal on the program timer PTM. If, now, any obstruction occurs between the sealing beams 52 and 58–62 when they are closing, (of course, other than the heat sealable sheet material) the obstruction will close the relative tape switch and immediately cause PT to step continuously to move the sealing bars away from each other.

Another safety feature lies in the "stop" switches 444 which are placed at strategic positions on the machine and are normally closed. These switches are in series and in series with relay coil 445. This relay coil controls the contacts 446 and 448. These contacts are normally open but are held closed by the energization of coil 445. With them so closed, the coil itself is in an energized state, and the contacts 448 connect one side of the power line to the control system.

If an emergency condition arises requiring a quick and permanent cutting off of power to the system, opening any of switches 444 momentarily will deenergize coil 445 and contacts 446 and 448 will open. Opening of 446 prevents reenergization of coil 445 if the safety switch 444 becomes accidentally closed before the trouble is cleared, and opening of contacts 448 cuts off the power to the system.

It will also be noted that in the drawings, the power source is preferably a 220 v.AC line which is used to supply the Vertrod heating units through conventional contactor switches. This voltage is stepped down by transformer 450 to 115 v.AC to run the control system. However, if desired, suitable units including Vertrod control units, timer PT, relays and switches can be obtained to operate at 220 v.AC. This is a designer's choice.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention what is claimed is:

1. Packaging apparatus for wrapping a bundle in a heat-sealable sheet sealing material film comprising:
    an entrance platform for supporting a bundle to be packaged;
    an exit platform adapted to receive the bundle and movable horizontally toward and away from the entrance platform, and being adjacent the entrance platform when in one of its positions of rest;
    a framework adjustably vertically mounted with its plane lying between the entrance and exit platforms, the exit platform overlying a portion of the framework when in said one position of rest;
    top and bottom sealing beams carried by said framework and movable toward and away from each other, the bottom beam normally being positioned at rest below the level of the entrance and exit platforms and below the exit platform when the latter is in said one position of rest adjacent the entrance platform;
    means for adjustably moving said framework and said sealing beams carried thereby to a predetermined position above said platforms in order to fix the line of side sealing along the length of the bundle at a predetermined distance above the entrance platform;
    plural sources of continuous sheets of sealing material, one source above said platforms, and one source below said platforms;
    guide means for conducting the sealing material from each source to a common vertical plane between the entrance and exit platforms;
    first means for moving said bundle from the entrance platform to the exit platform, the bundle thereby upon being so moved carrying the plastic sheet with it;
    means for moving the exit platform away from the entrance platform a distance sufficient to let the bottom sealing beam move upwardly between the platforms;
    means for causing said bottom and top sealing beams to move toward each other to bring together said sealing material behind said bundle for side sealing the sealing material;
    means for heating said sealing material sheets where brought together thereby to fuse them together in a seal and sever the sealed portion along a line while leaving sealed portions on each side of said line;
    control means for cycling the motion of said first means, the exit platform, and the bottom and top, sealing beams whereby after said exit platform has moved from the entrance platform but before said sealing beams move toward each other, said first means is moved out of the motion path of said sealing beams; and whereby after a sealing has taken place, said sealing beams are moved apart and said exit platform returns to said one position of rest adjacent said entrance platform; and
    end sealing means comprising a second platform for receiving the side sealed bundle from said exit platform; a horizontally extending lower beam at a fixed distance above floor level; an upper sealing beam movable toward the lower sealing bar to engage therewith, with end sealing material being pressed therebetween; heating means for fusing the end folds together along the meeting line of said upper and lower sealing beams; means for controlling the motion of the upper sealing means; and means for automatically adjusting the height of said second platform inversely with respect to the adjustment of said framework, whereby sealing of said end sealing material occurs generally in the horizontal mid-plane of the bundle.

2. The apparatus of claim 1 in which said second platform is rotatable in a horizontal plane whereby a bundle thereon may be turned end-for-end to present successively each end of the bundle to said end sealing means.

3. Packaging apparatus for wrapping a bundle in a heat-sealable sheet sealing material film comprising:
   an entrance platform for supporting a bundle to be packaged;
   an exit platform adapted to receive the bundle and movable horizontally toward and away from the entrance platform and being adjacent the entrance platform when in one of its positions of rest;
   a framework adjustably vertically mounted with its plane lying between the entrance and exit platforms, the exit platform overlying a portion of the framework when in said one position of rest;
   top and bottom sealing beams carried by said framework and movable toward and away from each other, the bottom beam normally being positioned at rest below the level of the entrance and exit platforms and below the exit platform when the latter is in said one position of rest adjacent the entrance platform;
   said top sealing beam comprising first and second longitudinally extending bars spaced from each other, the second bar being movable with respect to the first bar and dependent therefrom, thereby to permit motion of the second bar independently of the first bar in a direction toward and away from said bottom sealing beam, and to apply side sealing pressure;
   plural sources of continuous sheets of sealing material; one source above said platforms, and one source below said platforms;
   guide means for conducting the sealing material from each source to a common vertical plane between the entrance and exit platforms;
   first means for moving said bundle from the entrance platform to the exit platform, the bundle thereby upon being so moved carrying the plastic sheet with it;
   means for moving the exit platform away from the entrance platform a distance sufficient to let the bottom sealing beam move upwardly between the platforms;
   means for causing said bottom and top sealing beams to move toward each other to bring together said sealing material behind said bundle for side sealing the sealing material;
   means for heating said sealing material sheets where brought together thereby to fuse them together in a seal and sever the sealed portion along a line while leaving sealed portions on each side of said line; and
   control means for cycling the motion of said first means, the exit platform, and the bottom and top sealing beams whereby after said exit platform has moved from the entrance platform but before said sealing beams move toward each other, said first means is moved out of the motion path of said sealing beams; and whereby after a sealing has taken place, said sealing beams are moved apart and said exit platform returns to a position adjacent said entrance platform.

4. The apparatus of claim 3 in which said second bar is carried by fluid-powered cylinders attached to the first bar, the pistons of said cylinders being adapted, during extending motion from their cylinders, to move said lower bar toward said bottom sealing bar.

5. The apparatus of claim 3 including safety latch means carried by one of said top and bottom sealing beams, first detents for said latches carried by the other of said sealing beams in position to be engaged by said latches when said sealing beams are in position for a sealing operation, whereby said top and bottom beams are locked together by said latches and detents when said second bar is actuated by said cylinders to apply said side sealing pressure.

6. The apparatus of claim 5 including second detents mounted on said frame and adapted to be engaged by said latch means when said top sealing beam is in its topmost position, thereby to act as a safety support for the top sealing beam.

7. The apparatus of claim 6 including means for unlocking said latches from said second detents prior to motion of the top sealing beam toward sealing position, and unlocking said latches from said first detents prior to motion of the top sealing beam away from sealing position after a sealing operation.

8. The apparatus of claim 5 in which said control means is adapted to automatically control at least a portion of the cycling of the apparatus in the following sequence:
   a. The conveyor starts, carries a bundle to said entrance position, and then stops;
   b. The first means moves the bundle onto the exit platform and then moves out of the way;
   c. The exit platform moves away from the entrance platform, carrying the bundle with it;
   d. The latches unlock from the second detents;
   e. The top and bottom sealing beams move to the sealing position adjacent each other;
   f. The latches lock with the first detents;
   g. The lower sealing bar is moved to squeeze sealing material between it and the bottom sealing bar;
   h. Heat is applied to fuse the sheet material together, and then shut off;
   i. The latches are released from the first detents;
   j. The sealing beams move away from each other to their remote positions;
   k. The latches engage the safety detents; and
   l. The conveyor is restarted.

9. The apparatus of claim 8 including end sealing means for sealing the end folds of sealing material, comprising a table adapted to receive a side-sealed bundle from the exit platform, and including means for preventing said control means for causing cycling of the portions of the apparatus for side sealing so long as a bundle lies on said table.

* * * * *